W. J. RAFTERY.
TESTING MACHINE.
APPLICATION FILED APR. 14, 1921.

1,421,562.

Patented July 4, 1922.
3 SHEETS—SHEET 1.

INVENTOR
William J. Raftery.
By Frederick R. Ryon
ATTORNEY

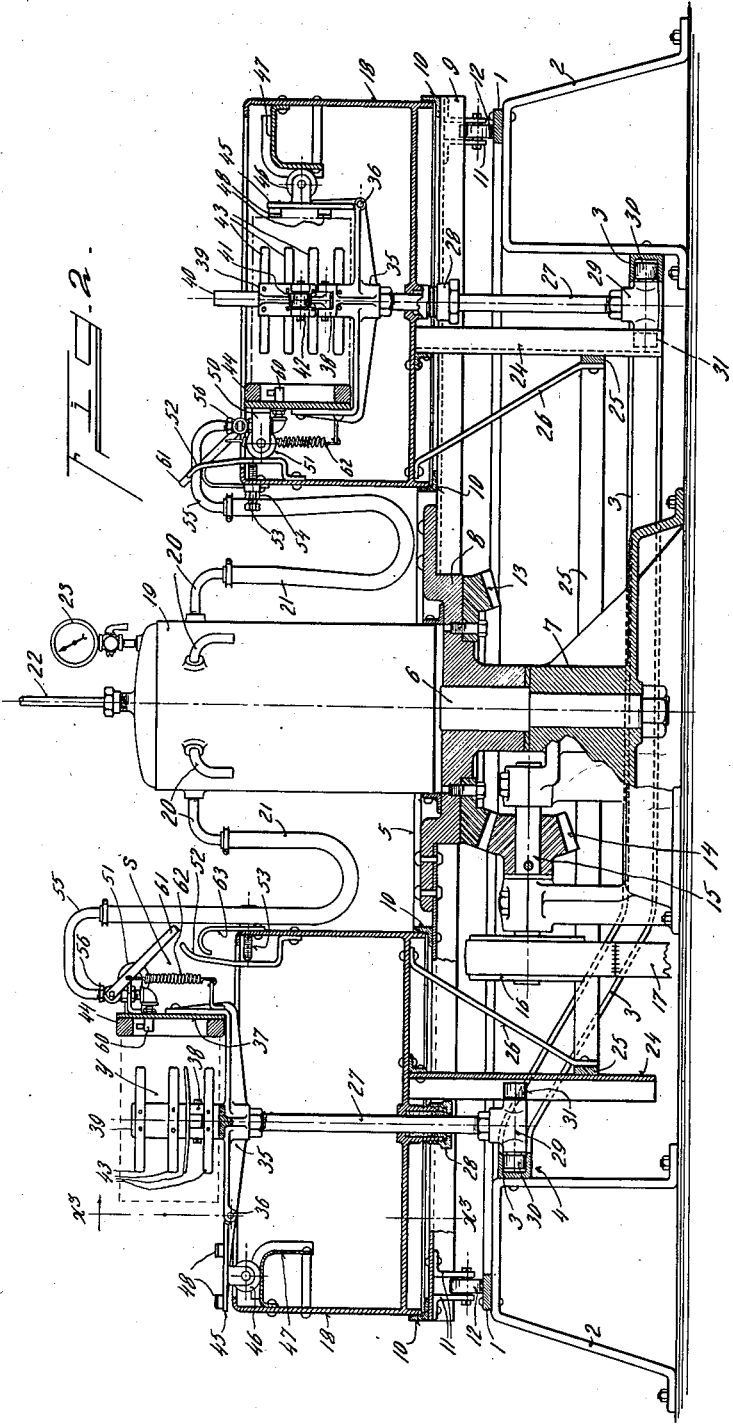

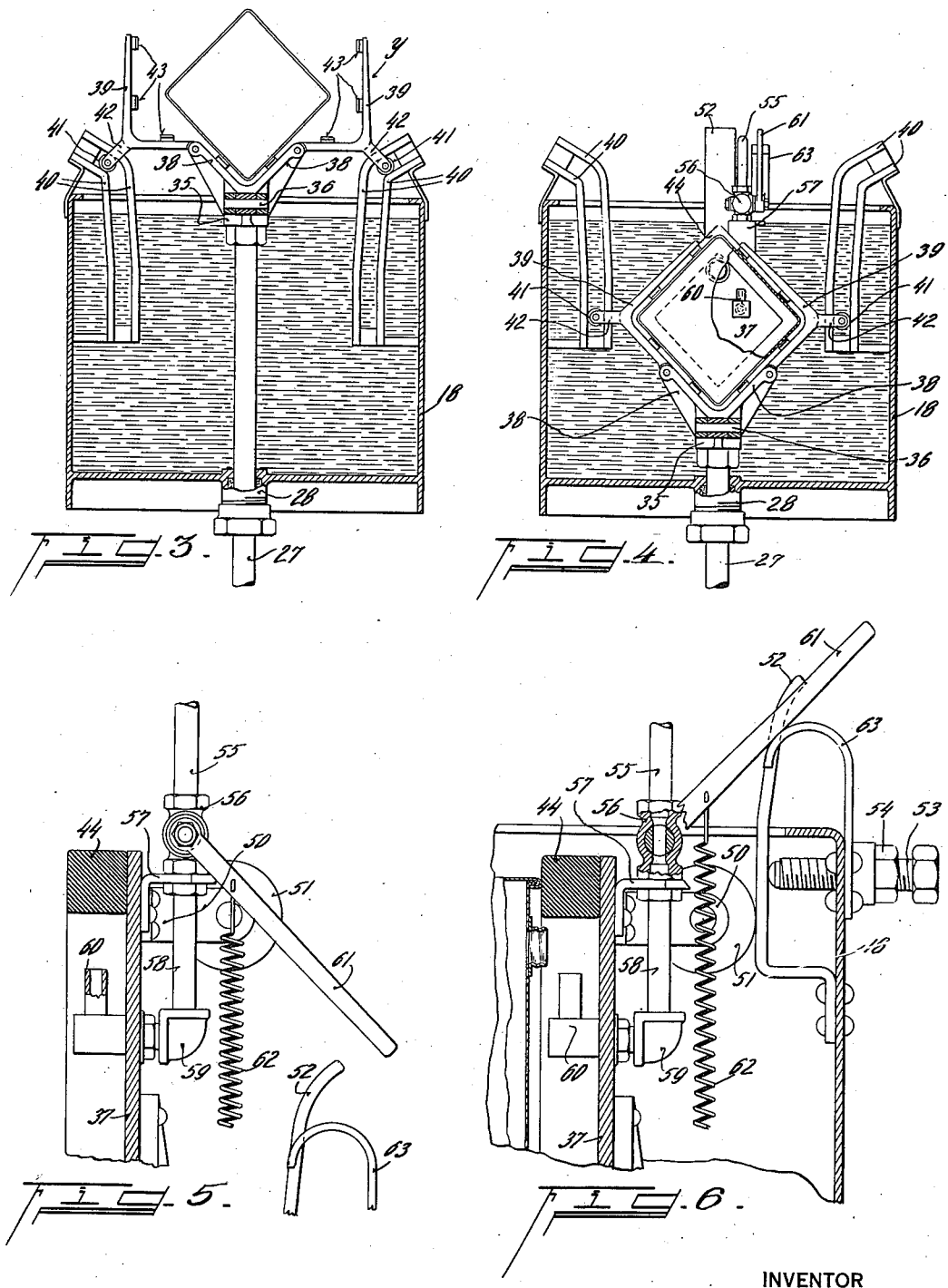

UNITED STATES PATENT OFFICE.

WILLIAM J. RAFTERY, OF BERKELEY, CALIFORNIA, ASSIGNOR TO STANDARD OIL COMPANY OF CALIFORNIA, OF SAN FRANCISCO, CALIFORNIA, A CORPORATION OF CALIFORNIA.

TESTING MACHINE.

1,421,562.  Specification of Letters Patent.  Patented July 4, 1922.

Application filed April 14, 1921. Serial No. 461,187.

*To all whom it may concern:*

Be it known that I, WILLIAM J. RAFTERY, a citizen of the United States, residing at Berkeley, in the county of Alameda and State of California, have invented a new and useful Testing Machine, of which the following is a specification.

This invention relates to testing machines and is particularly directed to a machine for testing containers for leakage.

The object of the invention is to provide a machine of continuous operation in which the containers are sealed and submerged in test tanks and during such submergence are filled with compressed air whereby leakage of the containers is indicated by bubbles rising to the surface of the liquid in the test tanks.

Various other objects and advantages, especially such as relate to details of construction and arrangement of parts, will be more fully apparent from the following description of the accompanying drawings, which form a part of this disclosure, and which illustrate a preferred form of embodiment of the invention.

Of the drawings:

Fig. 2 is an enlarged vertical section on line $x^2$—$x^2$ of Fig. 1, certain parts in rear of the plane of the section being omitted for the sake of clearness.

Fig. 3 is an enlarged detail section on line $x^3$—$x^3$ of Figure 2, showing the can gripper in elevated open position.

Fig. 4 is a similar section showing the can gripper in lowered closed position.

Fig. 5 is an enlarged elevation of one of the air control mechanisms in the elevated position indicated by the reference character *s* in Fig. 2.

Fig. 6 is a similar elevation showing the air control mechanism in the lowered position.

Figure 1:
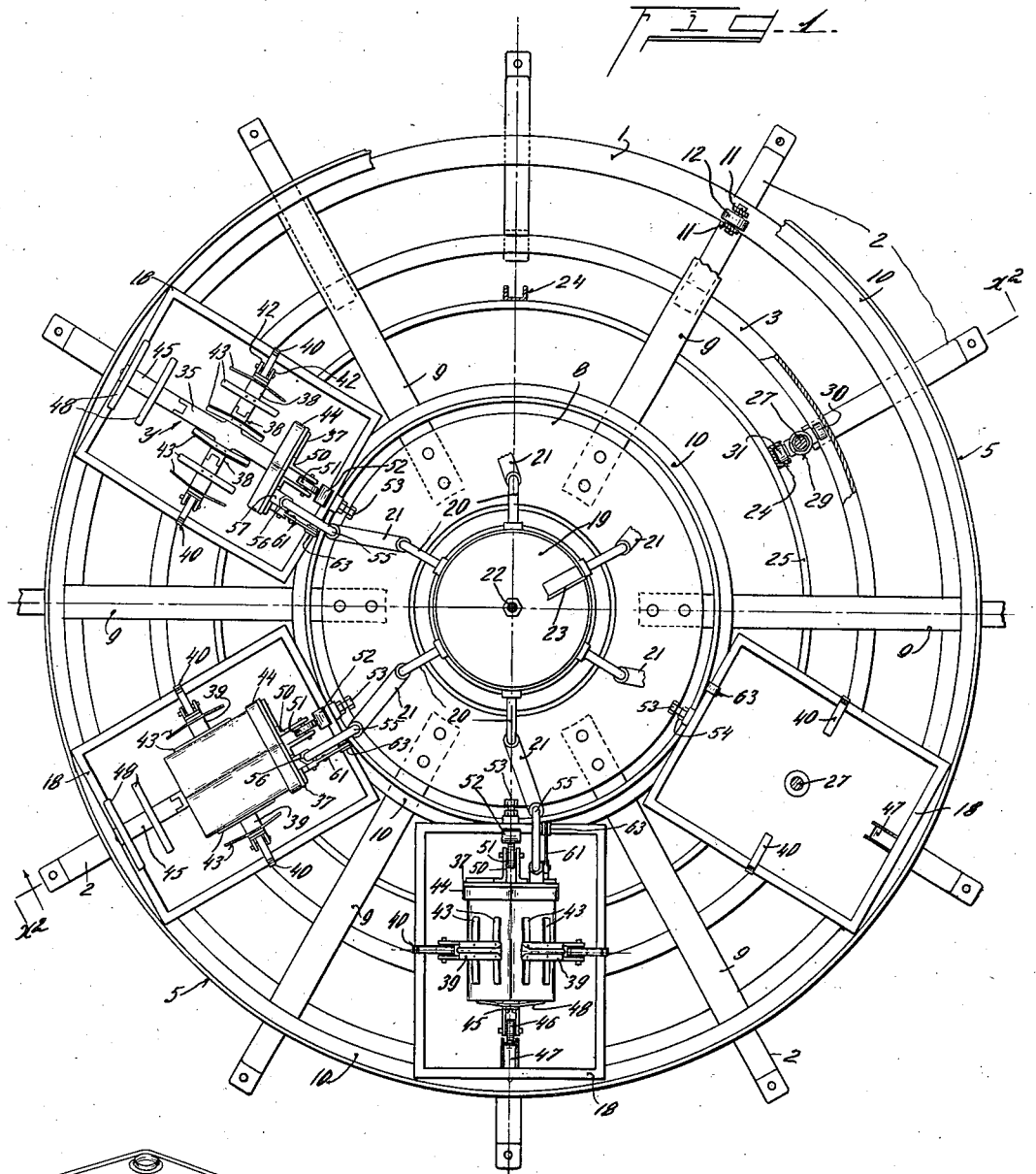
Figure 1 is a plan view of the machine, certain parts being broken and in section to more clearly illustrate the details of construction.
Figure 7:
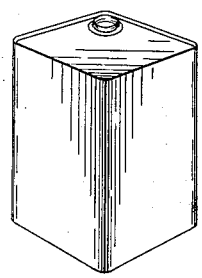
Fig. 7 is a perspective view of one of the cans which the machine illustrated is adapted to handle.

In general the machine of the present invention is designed for the purpose of testing containers for leakage and in the drawings the specific machine illustrated is designed to handle square cans, although it will be obvious that the machine may be designed to handle cans or other containers of various shapes.

As illustrated in the drawings the base of the machine comprises a circular track 1 supported upon a plurality of brackets 2, the brackets also supporting a circular channel cam way 3 which for a major portion of its circumference is disposed in a horizontal plane and which is bent upwardly at one point in its circumference, as indicated at 4, the purpose of this channel cam way being described later. A turn-table 5 is rotatable upon the central vertical pivot stud 6 fixed in a bearing block 7, the turn-table comprising a structural iron frame-work consisting of a centrally flanged boss 8 journaled to rotate on the pivot stud, radially disposed beams 9, and circular angle irons 10. Depending from each radial beam 9 is a pair of brackets 11 supporting the horizontally journaled roller 12, engaging the circular track 1.

Any suitable driving mechanism may be provided to rotate the turn-table, that illustrated in the drawing comprising a beveled gear 13 secured to the under surface of the boss 8 and meshing with the beveled pinion 14, said pinion being fixed upon the horizontal shaft 15 journaled in bearings formed on the bearing block 7. Fixed on the outer end of the shaft 15 is the drive pulley 16 which may be driven by a belt 17 or otherwise connected to any suitable source of power.

A plurality of test tanks 18 are supported on the turn-table in spaced relation and a compressed air reservoir or tank 19 is centrally supported upon the boss 8. The tank 19 has a plurality of outlet pipes 20 each connected by a hose 21 or other flexible conduit with the control device of the respective test tanks as will hereinafter be described. The tank 19 is further provided with an inlet pipe 22 connecting with any suitable source of compressed air supply, the tank 19 being further provided with a pressure indicating gage 23.

Dependingly supported from the bottom wall of each of the test tanks 18 is a vertically disposed channel iron guide track 24 and each guide track 24 is secured near its free end to a circular spacing ring 25, this structure being further reinforced against lateral displacement by diagonal struts 26 connected to said ring and to the respective tanks.

As all of the test tanks and associated mechanisms are of duplicate construction, a detailed description of one thereof will be adequate for the purposes of this disclosure.

A gripper device indicated in general by the reference character $y$ is positioned to reciprocate vertically in the test tank 18 and is carried upon the upper end of a shaft 27 extending through a central bore in the bottom of the tank and through a stuffing box 28 of standard or any desired type. Fixed to the lower end of the shaft 27 is a T head 29 with its transverse limb radially disposed relative to the center of the turn-table, and horizontally journaled upon opposite ends of said limb are anti-friction rollers 30, 31 respectively. The roller 31 engages in the vertical channel guide track 24 and serves to prevent the shaft 27 from rotating and the roller 30 engages in the circular channel cam way 3. By this construction it will be evident that as the turn-table revolves the gripper device will be alternately lowered and elevated into and out of the test tank.

The gripper device includes a head 35 having an outwardly extending arm formed to accommodate a horizontal pivot 36, an inwardly extending arm having an upturned end to which a vertical plate 37 is fixed, and oppositely disposed transverse arms 38. (See Figs. 3 and 4). Pivoted upon the free ends of the opposed arms 38 are right angled gripper bars 39. Fixed to each side wall of the tank 18 is a pair of relatively spaced track members 40 and positioned to travel between said track members is a cam roller 41 horizontally journaled in arms 42 projecting outwardly from the respective gripper bar 39. Secured to the inner surfaces of the arms 38 and of the gripper bars 39 are horizontally disposed leaf spring members 43 relatively spaced so that when the gripper bars engage the container as shown in Fig. 4, two of said spring members will engage each side of the container. These leaf spring members 43 are bowed longitudinally so as to form cushion elements compensating for slight variations in the size of the containers.

By an inspection of Figs. 3 and 4 it will be seen that with the mechanism in elevated position a container may be positioned upon the head 35 and that when the said mechanism is lowered the gripper bars will be cammed inwardly to engage and hold the container against displacement during its submergence in the tank and when again elevated the gripper bars will be cammed outwardly to release the container so that it may be removed and another container substituted in its place.

Secured to the outer face of the vertical plate 37 is a cushion element 44 in the form of a ring contoured to correspond with the shape of the container, in this instance, said element is of square contour adapting it to be engaged by the square container illustrated. Preferably this cushion element is formed of rubber so that when a container is forcibly held against its surface an air tight joint will be provided, the plate 37 and the cushion element 44 forming a sealing head for the containers. Of course, it will be understood that in a machine which is adapted to handle round containers this cushion element will be round. Hinged on the horizontal pivot 36 is an arm 45 provided with a cam roller 46 engaging a channel track 47 which is supported upon the outer side wall of the tank 18. The channel track 47 is contoured so that when the gripper device is in elevated position the arm 45 is disposed in a relatively horizontal position and when said device is in its lowered position the arm will be cammed upwardly to a substantially vertical position with its leaf spring cushion elements 48 engaging the bottom of the can. This causes the marginal portion of the top of the can to be pressed against the outer surface of the rubber cushion element 44 and slightly embedded in said surface to provide an air tight joint. Attached to the inner surface of the plate 37 is a bracket 50 and horizontally journaled in said bracket is a roller 51. Positioned in the tank 18 in vertical alignment with the roller 51 is an abutment shoe 52 secured at its lower end to the tank wall and projected upwardly. The free end of the shoe is slightly angled towards the center of the machine and has a curved upper end, and during the lowering of the gripper device the roller 51 engages the shoe to prevent lateral flexation of the plate 37 and its supporting arm. An adjusting screw 53 has a screw-threaded engagement in the side wall of the tank and its inner end contacts with the shoe 52. This adjusting screw is for the purpose of regulating the vertical alignment of the shoe so as to insure the proper vertical alignment of the cushion element 44 when the gripper device is in lowered position. A lock nut 54 secures the adjusting screw 53 in said position.

The hose or conduit 21 connects with a pipe 55 which in turn is connected to an air controlled valve 56 supported on a bracket 57 secured to the plate 37. A pipe 58 and a fitting 59 connects the valve 56 with a nozzle 60 which is carried by the plate 37, this arrangement providing an air line from the tank 19 to a point beyond the plate 37 and within the cushion element 44. With the can or receptacle in the position shown in Fig. 6 and with the margin of the can forming an air tight joint against the cushion element 44, it will be evident that compressed air introducing through the nozzle 60 will enter and fill the can.

Means are provided for insuring an automatic operation of the valve 56 and such means comprise a valve operating lever 61 normally spring drawn to valve closing position by spring 62 and positioned in vertical alignment with an abutment member 63 supported on the wall of the tank. During the lowering of the gripper device, the valve operating lever 61 contacts the abutment member 63 thereby opening the valve 56, said valve remaining in open position until the gripper device is again elevated and the valve restored to closed position by action of the spring 62.

In use the several test tanks 18 are filled with water and the tank 19 is filled with compressed air. With the device rotating at a suitable speed the cans or receptacles to be tested are successively placed in the gripper devices as they are elevated upon reaching the high portion 4 of the circular channel cam way 3, and upon the lowering of the gripper devices the cans are firmly held pressed against the rubber cushion elements 44 and the valve control mechanism operated to fill the cans with compressed air. With the cans thus submerged below the surface of the water and filled with compressed air, any leakage therein will be indicated by air bubbles arising to the surface of the water. After a complete rotation of each test tank and as it approaches the high portion 4 of the channel cam way 3, its gripper device will be elevated thereby shutting off the supply of compressed air and releasing the container which will then be manually or otherwsie removed and another container to be tested inserted in its place.

This mechanism provides a machine of continuous operation in which any leakage of the containers being tested is visually indicated and which is capable of being associated with any suitable type of automatic feeding device which discharges the receptacles at timed intervals.

While the form of mechanism herein illustrated and described is well adapted to fulfill the objects primarily stated, it is susceptible of various modifications and changes without departing from the broad scope of the invention as described in the following claims.

1. In a device of the class described, a test tank adapted to contain liquid, a reciprocating member, gripper devices carried by the reciprocating member and adapted to grip the sides of a receptacle to be tested, independent means carried by said member for sealing the filling opening of the receptacle, independent means automatically operating to force the receptacle against said sealing means during the submergence of the receptacle, and means for operating the reciprocating member.

2. In a device of the class described, a test tank adapted to contain liquid, a reciprocating member, gripper devices carried by said member and adapted to embrace a receptacle to be tested, means for operating said gripper devices, means on said member functioning independently of the gripper devices for sealing the filling opening of the receptacle, and means for operating the reciprocating member to submerge the receptacle in the tank.

3. In a device of the class described, a test tank adapted to contain liquid, a vertically movable member adapted to support a receptacle to be tested, a pair of gripper bars pivoted on said member, means independent of the gripper bars for sealing the filling opening of the receptacle, stationary means operating said bars during the lowering of the vertically movable member to grip the receptacle, and means for moving said member.

4. In a device of the class described, a test tank adapted to contain liquid, a reciprocating receptacle supporting member, gripper bars carried by said member, means independent of said gripper bars for sealing the filling opening of a receptacle to be tested, pressure means independent of said gripper bars for forcing the receptacle against said sealing means, means for reciprocating said member, stationary means operating the gripper bars during reciprocation of the supporting member to grip the receptacle, and other stationary means operating the pressure means during reciprocation of the supporting member to force the receptacle against the sealing means.

5. In a device of the class described, a base, a turn-table rotatable upon the base, a plurality of test tanks carried by the turn-table, vertically reciprocating gripper devices one associated with each tank adapted to embrace containers to be tested and lower them into the respective tanks, said devices including means for sealing the containers, and means introducing compressed air into the containers while in the respective tanks.

6. In a device of the class described, a base having a cam way, a turn-table rotatable upon the base, a plurality of test tanks carried by the turn-table, vertically reciprocating gripper devices one associated with each tank, each gripper device including a supporting shaft extending through the floor of the respective tank, a vertical guide depending below the tank, means carried by the shaft and engaging the vertical guide to prevent rotation of the shaft, and other means carried by the shaft and engaging the cam way, the cam way being formed to successively elevate the gripper devices at one point in the rotation of the turn-table.

7. The structure set forth in claim 5 combined with means associated with the base and cooperating with the gripper devices to elevate said devices at one point in the rotation of the turn-table.

8. The structure set forth in claim 6 combined with means cooperating with each gripper device causing it to function during its downward travel to embrace a container to be tested, and means introducing compressed air into the container while in lowered position.

9. In a device of the class described, a test tank, a reciprocating member, gripper bars on said member, adapted to grip the sides of a receptacle to be tested, means on the reciprocating member independent of the gripper bars for sealing the filling opening of said receptacle, other means on the reciprocating member independent of the gripper bars for forcing the receptacle against said sealing means, means for operating the reciprocating member, and stationary means operating the gripper bars and said other means during the lowering of the receptacle.

10. In a device of the class described, a test tank containing liquid, and a receptacle engaging and operating mechanism operable to seal, hold and submerge a receptacle to be tested, said mechanism including means operable to grip the sides of the receptacle, means for operating said gripping means, means sealing the filling opening of the receptacle, and means engaging the end of the receptacle to force it against the sealing means.

Signed at Richmond, Calif., this 7th day of April, 1921.

WILLIAM J. RAFTERY.

Witnesses:
C. E. SINGER,
C. A. GREEN.